United States Patent Office 3,810,878
Patented May 14, 1974

3,810,878
PROCESS FOR PREPARING POLYMERS
Hideo Sato and Kunitoshi Shimizu, Fuji, Japan, assignors to Asahi Kasei Kogyo Kabushiki Kaisha, Osaka, Japan
No Drawing. Filed Sept. 9, 1971, Ser. No. 179,227
Claims priority, application Japan, Sept. 22, 1970, 45/82,503
Int. Cl. C08f 1/62
U.S. Cl. 260—78.5 B   10 Claims

ABSTRACT OF THE DISCLOSURE

Process for preparing a polymeric material which comprises polymerizing acrylonitrile or acrylonitrile admixed with a minor amount of at least one ethylenically unsaturated compound copolymerizable therewith in the presence of a catalyst system consisting of redox type catalyst and at least one oxime in an aqueous medium. Thus produced polymers or copolymers may be used as starting materials for acrylic synthetic fibers superior in both whiteness and heat stability of whiteness.

---

This invention relates to a process for preparing polymeric materials. It more particularly refers to a new process for preparing polymers and copolymers of acrylonitrile.

There have been proposed many polymerization catalysts for preparing polymers and copolymers of acrylonitrile in an aqueous medium polymerization.

Such catalysts include substances which have ability to initiate polymerization by themselves such as persulfates and perborates, and redox type catalysts consisting of oxidizing agents which have no ability to initiate polymerization by themselves such as chlorates and potassium permanganate and reducing agents such as sulfoxy compounds. Generally the redox type polymerization catalyst is not a mere combination of any oxidizing and reducing substance but a unique combination of the two kinds of substances.

Usefulness of a polymerization catalyst depends on physical properties of the produced polymer as well as ability to initiate polymerization.

It is an object of this invention to provide a polymerization or copolymerization process of acrylonitrile in a novel catalyst system which has a high polymerization-initiating ability and can produce polymers or copolymers having a desired degree of polymerization with high yields and being starting materials for acrylic synthetic fibers superior in both whiteness and heat stability of whiteness.

Other and additional objects of this invention will become apparent from a consideration of this entire specifiaction.

In accord with and fulfilling these objects, there is provided a process for preparing a polymeric material which comprises polymerizing (a) acrylonitrile or (b) acrylonitrile admixed with a minor amount of at least one ethylenically unsaturated compound copolymerizable therewith in an aqueous medium by using a catalyst system consisting of a redox type catalyst and at least one oxime of one of the two following general formulae:

$$HON=C\begin{matrix}R_1\\R_2\end{matrix} \quad \text{and} \quad HON=C\begin{matrix}\\R_3\end{matrix}$$

(I)                 (II)

wherein $R_1$ and $R_2$ are each selected from the group consisting of hydrogen and an alkyl group having 1 to 10 carbon atoms, and $R_3$ represents an alkylene group having 4 to 10 carbon atoms.

Example of suitable oximes include

| | |
|---|---|
| formaldoxime, | ethyl-i-pentylketoxime, |
| acetaldoxime, | ethyl-i-hexylketoxime, |
| propionaldoxime, | ethyl-i-heptylketoxime, |
| n-butylaldoxime, | ethyl-n-octylketoxime, |
| i-butylaldoxime, | ethyl-n-nonylketoxime, |
| n-pentylaldoxime, | ethyl-2-methylbutyl- |
| i-pentyl-aldoxime, | ketoxime, |
| acetoxime, | ethyl-3,3-dimethylpentyl- |
| ethylmethylketoxime, | ketoxime, |
| i-butylmethylketoxime, | di-n-propylketoxime, |
| methyl-n-pentylketoxime, | di-i-butylketoxime, |
| methylneopentylketoxime, | n-butyl-i-heptylketoxime, |
| n-hexylmethylketoxime, | cyclohexanone oxime, |
| n-heptylmethylketoxime, | cycloheptanone oxime, |
| n-decylmethylketoxime, | cyclooctanone oxime, |
| diethylketoxime, | cyclodecanone oxime | and cycloundecanone oxime.

These oximes are preferably used in an amount of from about 5 to 100 percent by weight based upon the total weight of the oxidizing agent and the amount of the oxime may be varied within the above-described range depending upon the polymerization conditions and the properties of the polymer.

The redox type catalyst according to the present invention comprises (1) at least one oxidizing substance and (2) at least one reducing sulfoxy compound.

Examples of suitable oxidizing substance include persulfuric acid, the water-soluble sodium, potassium, magnesium, ammonium salt thereof, hydroxylamine-N-monosulfonic acid, the water-soluble sodium, potassium, magnesium, ammonium salt thereof, hydroxylamine-N,N-disulfonic acid, the water-soluble sodium, potassium, magnesium, ammonium salt thereof and sodium, potassium and ammonium chlorates.

Examples of suitable reducing sulfoxy compounds include sulfurous acid, water-soluble sodium, potassium, magnesium and ammonium sulfite, hyposulfite, bisulfite, and metabisulfite.

The amount of the oxidizing substance is usually about 0.1 to 10 percent by weight of the total weight of the acrylonitrile or the acrylonitrile admixed with a minor amount of the ethylenically unsaturated compound.

The amount of the reducing sulfoxy compound is usually up to 30 percent by weight of the total weight of the acrylonitrile or the acrylonitrile admixed with a minor amount of the ethylenically unsaturated compound.

Examples of suitable ethylenically unsaturated compounds copolymerizable with acrylonitrile include methacrylonitrile acrylic acid, α-chloroacrylic acid, α-bromoacrylic acid, methacrylic acid; acrylates such as methyl methacrylate, methoxy methacrylate, ethyl methacrylate, butyl methacrylate, or methyl acrylate, ethyl acrylate, butyl acrylate, methyl α-chloroacrylate, ethyl α-chloroacrylate, butyl α-chloroacrylate; vinyl chloride, vinyl fluoride, vinyl bromide, vinylidene chloride; methacrylonitrile; acrylamide and methacrylamide; α-chloroacrylamide or alkyl-substituted products thereof such as N,N-dimethylacrylamide; methyl vinyl ketone; vinyl carboxylic acid and vinyl carboxylates such as vinyl acetate, vinyl chloroacetate, vinyl propionate, vinyl stearate; N-vinylimides, such as N-vinyl phthalimide, N-vinyl succinimide; methylene malonic acid ester, N-vinyl carbazole; vinyl furan; alkyl vinyl ethers such as methyl vinyl ether, ethyl vinyl ether, propyl vinyl ether; vinyl sulfonic acids or salts thereof such as allyl sulfonic acid, methallyl sulfonic acid, p-styrene sulfonic acid, sodium, potassium and ammonium salts thereof; ethylene $\alpha,\beta$-dicarboxylic acids, anhydrides or derivatives thereof such as maleic acid, maleic anhydride, dimethyl maloate; vinylpyridines such as 2-vinylpyridine, 4 - vinylpyridine, 2-methyl-5-vinylpyridine; 1 - vinylimidazoles and alkyl-substituted 1-vinylimidazoles, such as 2-, 4-, or 5-methyl-1-vinylimidazole, and other $>C=C<$ containing polymerizable materials. These compounds may be effectively used either alone or in various combinations of two or more selected monomers.

These ethylenically unsaturated compounds are employed in an amount of from 0.01 to 40 mole percent, preferably from 0.01 to 15 mole percent based on the acrylonitrile.

Known polymerization regulators may also be employed. Exemplary polymerization regulators include mercaptans such as dodecyl mercaptan and thioglycol. The amount of the polymerization regulators may preferably be from about 0.05 to 4 percent by weight of the total weight of the acrylonitrile or the acrylonitrile admixed with a minor amount of the ethylenically unsaturated compound.

Furthermore, there may be employed various compounds such as dyes, pigments, other coloring agents, stabilizers, surfactants and other additives which may be used in the production of acrylonitrile polymers and copolymers.

The present polymerization is effected in an aqueous medium and the monomeric material and water may be employed at a weight ratio of about 1:1 to 1:30. When the weight of water is less than that of the monomeric material it is difficult to control the polymerization such as degree of polymerization, distribution of degree of polymerization. On the other hand when water is too much, the concentration of the monomeric material becomes low and the polymerization is remarkably retarded for practical commercial purposes.

The polymerization is carried out in an acidic medium and preferably at a pH between 1 and 4. In order to maintain such pH, inorganic acid such as sulfuric acid, nitric acid, hydrochloric acid may be employed.

The polymerization methods include aqueous solution polymerization, emulsion polymerization, suspension polymerization and water-organic solvent polymerization.

The polymerization is carried out at a temperature between 10° C. to 80° C., preferably between 30° C. and 70° C. Below 10° C. the polymerization may hardly be carried out at economical rate, while at too high a temperature the decomposition rate of polymerization catalyst becomes too unnecessarily great to produce a desirable polymer.

The present polymerization may preferably be effected in the absence of oxygen, and therefore air in the reactor may be replaced by an inert gas such as nitrogen before the polymerization starts.

The applicable polymerization processes are batch polymerization processes, semi-continuous and continuous polymerization processes.

The features of the present invention can more fully be understood by the following non-limiting illustrating examples. Parts are by weight unless expressly stated to the contrary. The reduced viscosity of a polymer ($\eta_{sp.}/c$) is measured at a polymer concentration of 0.2 g./100 ml. dimethyl formamide at 35° C. and the whiteness of a polymer is calculated from reflection by a spectrophotometer assuming the value of magnesium oxide as 100.

EXAMPLE 1

In a 500 ml. glass ampoule, there were charged 1,200 parts of water, 100 parts of acrylonitrile, one part of ammonium persulfate, 5 parts of sodium bisulfite, 2 parts of sulfuric acid and a variety of oximes set forth in Table 1 at 5° C. After the air in the ampoule was displaced with nitrogen and the ampoule was sealed by fusion, polymerization was effected by shaking the ampoule for 4 hours in a thermostat kept at 50° C. Then, the ampoule was cooled and opened and the contents were filtered off, washed with water and dried at 50° C. to give a white polymer. The reduced viscosities and the yields of the polymer are shown in Table 1. The polymer was dissolved in a 70% purified nitric acid at 0° C., regenerated in a 35% nitric acid, washed with water, dried, and subjected to dry heat treatment at 180° C. for 10 minutes and then subjected to wet heat treatment in superheated steam at 135° C. for 10 minutes. The results are shown in Table 1.

In order to compare the product with the conventional redox catalyst, polymerization was effected in the same manner as above, except that the oximes were not used. The results are shown in Table 1.

EXAMPLE 2

In a 500 ml. glass ampoule, there were charged 1,200 parts of water, 91 parts of acrylonitrile, 8 parts of methyl acrylate, one part of sodium p-styrene sulfonate, one part of ammonium hydroxylamine-N-monosulfonate, 5 parts of sodium bisulfite, 2 parts of sulfuric acid and a variety of oximes set forth in Table 2 at 5° C. and after the air in the ampoule was displaced with nitrogen the ampoule was sealed. Polymerization was effected in the same manner as in Example 1. As in Example 1, one control experiment was run in the absence of the oxime. Then, the resulting polymers were treated in the same manner as in Example 1. The results are shown in Table 2.

EXAMPLE 3

In a 500 ml. glass ampoule, there were charged 1,200 parts of water, 80 parts of acrylonitrile, 15 parts of vinyl acetate, 5 parts of n-butyl acrylate, one part of magnesium persulfate, 4 parts of magnesium metabisulfite, 2 parts of sulfuric acid and a variety of oximes set forth in Table 4 at 5° C. and after the air in the ampoule was displaced with nitrogen the amopule was sealed and polymerization was effected in the same manner as in Example 1. As in Example 1, a control experiment was carried out in the absence of the oxime. Then, the resulting polymers were treated in the same manner as in Example 1. The results are shown in Table 3.

EXAMPLE 4

In a 1,000 ml. glass ampoule, there were charged 1,200 parts of water, 90 parts of acrylonitrile, one part of 2-vinylpyridine, 2 parts of methacrylic acid, 7 parts of methyl acrylate, 0.5 part of potassium persulfate, 0.5 part of sodium persulfate, 2 parts of potassium bisulfite, 2 parts of ammonium bisulfite and a variety of oximes set forth in Table 1 at 5° C. After the air in the amopule was displaced with nitrogen and the ampoule was sealed by fusion. Polymerization was carried out by shaking the ampoule in a thermostat kept at 50° C. for 4 hours. Then, the ampoule was cooled and opened and the contents were filtered off, washed with water and dried at 50° C. to give a white polymer. This polymer was dissolved in a 69% purified nitric acid at 0° C., defoamed, and extruded through a spinnerette at 0° C. into a 35% nitric acid to form yarns. These yarns were washed with water, stretched to 6 times its length in hot water at 98° C. and dried. The resulting yarns were subjected to wet heat treatment in super-heated steam at 135° C. for 10 minutes. The results are shown in Table 4.

EXAMPLE 5

In the same manner as in Example 1, polymerization was carried out using 0.2 part of acetoxime and a variety of oxidizing susbtances and reducing sulfoxy compounds set forth in Table 5 instead of one part of ammonium persulfate and 5 parts of sodium bisulfite. The results are shown in Table 5.

EXAMPLE 6

In the same manner as in Example 2, polymerization was carried out using 0.3 part of cyclohexanone oxime and 90 parts of acrylonitrile and a variety of ethylenically unsaturated compounds as comonomer set forth in Table 6. The results are shown in Table 6.

TABLE 1

| Run number | Oxime (parts) | | Yield of polymer (parts) | Reduced viscosity of polymer ($\eta_{sp}/c$) | Whiteness | | | |
|---|---|---|---|---|---|---|---|---|
| | | | | | Dried after polymerization (not heat-treated) | Regenerated in nitric acid (not heat-treated) | Treated by superheated steam heat at 135° C. | Treated by dry heat at 180° C. |
| 1 | Acetaldoxime | (0.2) | 91 | 1.70 | 103 | 101 | 97 | 89 |
| 2 | Propionaldoxime | (0.2) | 92 | 1.71 | 103 | 101 | 97 | 90 |
| 3 | n-Butylaldoxime | (0.2) | 92 | 1.71 | 102 | 100 | 95 | 87 |
| 4 | i-Butylaldoxime | (0.2) | 93 | 1.70 | 103 | 101 | 97 | 90 |
| 5 | n-Pentylaldoxime | (0.2) | 91 | 1.72 | 104 | 102 | 98 | 91 |
| 6 | i-Hexylaldoxime | (0.2) | 94 | 1.75 | 105 | 103 | 99 | 92 |
| 7 | Acetoxime | (0.2) | 92 | 1.76 | 104 | 102 | 98 | 90 |
| 8 | Ethyl-i-butylketoxime | (0.1) | 92 | 1.71 | 103 | 101 | 97 | 89 |
| | Cyclohexanone oxime | (0.1) | | | | | | |
| 9 | Ethylmethylketoxime | (0.1) | 93 | 1.75 | 102 | 100 | 94 | 86 |
| | Cyclohexanone oxime | (0.1) | | | | | | |
| 10 | Diethylketoxime | (0.1) | 91 | 1.71 | 102 | 100 | 93 | 85 |
| | Cyclooctanone oxime | (0.1) | | | | | | |
| 11 | Cycloheptanone oxime | (0.2) | 92 | 1.76 | 102 | 100 | 94 | 86 |
| 12 (reference) | None | | 88 | 1.66 | 100 | 97 | 86 | 89 |

TABLE 2

| Run number | Oxime (parts) | | Yield of polymer (parts) | Reduced viscosity of polymer ($\eta_{sp}/c$) | Whiteness | | | |
|---|---|---|---|---|---|---|---|---|
| | | | | | Dried after polymerization (not heat-treated) | Regenerated in nitric acid (not heat-treated) | Treated by superheated steam heat at 135° C. | Treated by dry heat at 180° C. |
| 13 | Acetaldoxime | (0.1) | 92 | 1.72 | 103 | 101 | 96 | 89 |
| 14 | i-Butylaldoxime | (0.2) | 91 | 1.76 | 104 | 102 | 97 | 90 |
| 15 | n-Pentylaldoxime | (0.2) | 92 | 1.78 | 102 | 100 | 95 | 88 |
| 16 | do | (0.5) | 91 | 1.76 | 103 | 101 | 96 | 89 |
| 17 | do | (1.0) | 93 | 1.76 | 104 | 102 | 97 | 90 |
| 18 | do | (4.0) | 92 | 1.75 | 103 | 101 | 96 | 89 |
| 19 | Methyl-n-pentylketoxime | (0.3) | 93 | 1.75 | 103 | 101 | 96 | 89 |
| 20 | Methyl-n-hexylketoxime | (0.2) | 91 | 1.76 | 102 | 100 | 95 | 88 |
| 21 | Methyl-n-heptylketoxime | (0.1) | 92 | 1.72 | 103 | 101 | 96 | 89 |
| | Cycloundecanone oxime | (0.1) | | | | | | |
| 22 | Ethyl-n-octylketoxime | (0.1) | 93 | 1.76 | 103 | 101 | 96 | 89 |
| | Cyclodecanone oxime | (0.1) | | | | | | |
| 23 | Ethyl-n-nonylketoxime | (0.1) | 91 | 1.78 | 103 | 101 | 96 | 89 |
| | Cyclodecanone oxime | (0.1) | | | | | | |
| 24 (reference) | None | | 89 | 1.70 | 100 | 97 | 85 | 70 |

TABLE 3

| Run number | Oxime (parts) | | Yield of polymer (parts) | Reduced viscosity of polymer ($\eta_{sp}/c$) | Whiteness | | | |
|---|---|---|---|---|---|---|---|---|
| | | | | | Dried after polymerization (not heat-treated) | Regenerated in nitric acid (not heat-treated) | Treated by superheated steam heat at 135° C. | Treated by dry heat at 180° C. |
| 25 | Acetaldoxime | (0.1) | 91 | 1.76 | 102 | 101 | 96 | 89 |
| | Ethylmethylketoxime | (0.1) | | | | | | |
| 26 | Acetoxime | (0.05) | 92 | 1.78 | 103 | 102 | 97 | 90 |
| | n-Hexylaldoxime | (0.15) | | | | | | |
| 27 | Ethylmethyketoxime | (0.1) | 94 | 1.75 | 101 | 100 | 95 | 88 |
| | Ethyl-i-hexylketoxime | (0.1) | | | | | | |
| 28 | Diethylketoxime | (0.15) | 91 | 1.76 | 102 | 102 | 97 | 90 |
| | Ethyl-2-methylbutylketoxime | (0.05) | | | | | | |
| 29 | Di-i-butylketoxime | (0.1) | 92 | 1.73 | 101 | 100 | 95 | 88 |
| | Formaldoxime | (0.1) | | | | | | |
| 30 | n-Butyl-i-pentylketoxime | (0.1) | 93 | 1.75 | 102 | 101 | 96 | 89 |
| | Methyl-2,2-dimethylpropylketoxime | (0.1) | | | | | | |
| 31 | Methyl-n-decanylketoxime | (0.1) | 91 | 1.78 | 102 | 102 | 97 | 90 |
| | Ethyl-i-pentylketoxime | (0.1) | | | | | | |
| 32 | Di-n-propylketoxime | (0.1) | 92 | 1.78 | 103 | 102 | 97 | 89 |
| | Ethyl-3,3-dimethylpentylketoxime | (0.1) | | | | | | |
| 33 (reference) | None | | 87 | 1.72 | 100 | 98 | 86 | 76 |

TABLE 4

| Run number | Oxime | (parts) | Yield of polymer (parts) | Reduced viscosity of polymer ($\eta_{sp}/c$) | Whiteness Untreated yarn | Yarn treated by superheated steam heat at 135° C. |
|---|---|---|---|---|---|---|
| 34 | Formaldoxime | (0.1) | 91 | 1.68 | 102 | 97 |
|  | Cycloheptanone oxime | (0.1) |  |  |  |  |
| 35 | Acetoxime | (0.1) | 92 | 1.70 | 101 | 96 |
|  | Cyclooctanone oxime | (0.1) |  |  |  |  |
| 36 | n-Propylaldoxime | (0.1) | 92 | 1.71 | 102 | 97 |
|  | Cycloundecanone oxime | (0.1) |  |  |  |  |
| 37 | Ethyl-i-pentylketoxime | (0.2) | 91 | 1.69 | 101 | 96 |
| 38 | i-Pentylaldoxime | (0.2) | 92 | 1.70 | 103 | 97 |
| 39 | Cycloheptanone oxime | (0.2) | 91 | 1.69 | 102 | 96 |
| 40 | Cyclopentanone oxime | (0.2) | 92 | 1.71 | 103 | 95 |
| 41 (reference) | None |  | 85 | 1.65 | 100 | 85 |

TABLE 5

| Run number | Oxidizing substance and reducing sulfoxy compound (part) | | Oxime (0.2 part) | Yield of polymer (parts) | Reduced viscosity of polymer ($\eta_{sp}/c$) | Whiteness Dried after polymerization (not heat-treated) | Regenerated in nitric acid (not heat-treated) | Treated by superheated steam heat at 135° C. | Treated by dry heat at 180° C. |
|---|---|---|---|---|---|---|---|---|---|
| 42 | Sodium hydroxylamine-N-monosulfonate. | (2) | Acetoxime | 92 | 1.78 | 102 | 100 | 97 | 89 |
|  | Potassium sulfite | (4) |  |  |  |  |  |  |  |
| 43 (reference) | Same as above |  | None | 90 | 1.91 | 98 | 97 | 86 | 79 |
| 44 | Magnesium hydroxylamine-N-monosulfonate. | (2.5) | Acetoxime | 86 | 1.90 | 103 | 101 | 97 | 90 |
|  | Magnesium bisulfite | (2.5) |  |  |  |  |  |  |  |
| 45 (reference) | Same as above |  | None | 80 | 2.01 | 100 | 98 | 87 | 80 |
| 46 | Persulfuric acid | (1) | Acetoxime | 91 | 1.90 | 101 | 100 | 96 | 88 |
|  | Sodium metabisulfite | (6) |  |  |  |  |  |  |  |
| 47 (reference) | Same as above |  | None | 90 | 1.88 | 96 | 95 | 84 | 76 |
| 48 | Hydroxylamine-N-monosulfonic acid. | (1) | Acetoxime | 95 | 1.99 | 100 | 98 | 94 | 86 |
|  | Potassium metabisulfite | (3) |  |  |  |  |  |  |  |
|  | Ammonium metabisulfite | (3) |  |  |  |  |  |  |  |
| 49 (reference) | Same as above |  | None | 90 | 1.76 | 94 | 91 | 80 | 71 |
| 50 | Hydroxylamine-N,N-disulfonic acid. | (1.5) | Acetoxime | 86 | 1.69 | 101 | 100 | 96 | 89 |
|  | Sodium hyposulfite | (4) |  |  |  |  |  |  |  |
| 51 (reference) | Same as above |  | None | 82 | 1.56 | 95 | 92 | 80 | 70 |
| 52 | Potassium hydroxylamine-N,N-disulfonate. | (2) | Acetoxime | 86 | 1.75 | 102 | 100 | 98 | 90 |
|  | Potassium hyposulfite | (6) |  |  |  |  |  |  |  |
| 53 (reference) | Same as above |  | None | 80 | 1.68 | 97 | 95 | 83 | 77 |
| 54 | Sodium hydroxylamine-N,N-disulfonate. | (2) | Acetoxime | 90 | 1.91 | 103 | 101 | 98 | 90 |
|  | Ammonium bisulfite | (6) |  |  |  |  |  |  |  |
| 55 (reference) | Same as above |  | None | 89 | 1.90 | 100 | 97 | 87 | 80 |
| 56 | Magnesium hydroxylamine-N,N-disulfonate. | (3) | Acetoxime | 92 | 2.01 | 104 | 102 | 99 | 92 |
|  | Magnesium hyposulfite | (5) |  |  |  |  |  |  |  |
| 57 (reference) | Same as above |  | None | 90 | 2.00 | 99 | 96 | 85 | 78 |
| 58 | Ammonium hydroxylamine-N,N-disulfonate. | (2) | Acetoxime | 89 | 1.88 | 101 | 100 | 96 | 89 |
|  | Ammonium sulfite | (8) |  |  |  |  |  |  |  |
| 59 (reference) | Same as above |  | None | 87 | 1.68 | 96 | 94 | 82 | 75 |
| 60 | Sodium hydroxylamine-N-monosulfonate. | 2 | Acetoxime | 92 | 1.98 | 100 | 99 | 94 | 90 |
|  | Ammonium hyposulfite | 5 |  |  |  |  |  |  |  |
| 61 (reference) | Same as above |  | None | 91 | 1.93 | 95 | 91 | 80 | 72 |
| 62 | Magnesium hydroxylamine-N-monosulfinate. | 1.5 | Acetoxime | 90 | 1.79 | 102 | 100 | 96 | 91 |
|  | Magnesium sulfite | 6 |  |  |  |  |  |  |  |
| 63 (reference) | Same as above |  | None | 86 | 1.64 | 96 | 95 | 82 | 75 |
| 64 | Sodium chlorate | 1 | Acetoxime | 96 | 2.14 | 101 | 100 | 98 | 90 |
|  | Sodium bisulfite | 4 |  |  |  |  |  |  |  |
| 65 (reference) | Same as above |  | None | 94 | 2.05 | 99 | 98 | 90 | 86 |
| 66 | Potassium chlorate | 1 | Acetoxime | 95 | 2.20 | 103 | 101 | 98 | 91 |
|  | Sodium bisulfite | 4 |  |  |  |  |  |  |  |
| 67 (reference) | Same as above |  | None | 94 | 2.09 | 100 | 98 | 90 | 87 |
| 68 | Ammonium chlorate | 1 | Acetoxime | 96 | 2.17 | 102 | 100 | 99 | 90 |
|  | Sodium bisulfite | 4 |  |  |  |  |  |  |  |
| 69 (reference) | Same as above |  | None | 93 | 2.07 | 101 | 98 | 91 | 86 |

TABLE 6

| Run No. | Comonomer (parts) | Oxime (0.3 part) | Yield of polymer (part) | Reduced viscosity of polymer ($\eta_{sp}/c$) | Whiteness | | | |
|---|---|---|---|---|---|---|---|---|
| | | | | | Dried after polymerization –not heat-treated | Regenerated in nitric acid (not heat-treated) | Treated by superheated steam heat at 135° C. | Treated by dry heat at 180° C. |
| 70 | Ethyl acrylate (10) | Cyclohexanone oxime. | 93 | 1.76 | 103 | 101 | 97 | 89 |
| 71 (reference) | Same as above | None | 91 | 1.70 | 100 | 97 | 84 | 79 |
| 72 | Methacrylonitrile (9) Sodium methallyl-sulfonate. (1) | Cyclohexanone oxime. | 90 | 1.63 | 103 | 102 | 98 | 90 |
| 73 (reference) | Same as above | None | 89 | 1.61 | 100 | 98 | 85 | 80 |
| 74 | Acrylamide (5) N,N-dimethylacrylamide (5) | Cyclohexanone oxime. | 90 | 1.59 | 99 | 98 | 89 | 83 |
| 75 (reference) | Same as above | None | 86 | 1.50 | 96 | 93 | 79 | 70 |
| 76 | Methyl methacrylate (10) | Cyclohexanone oxime. | 92 | 1.69 | 104 | 103 | 98 | 96 |
| 77 (reference) | Same as above | None | 91 | 1.60 | 101 | 100 | 89 | 85 |
| 78 | Acrylic acid (5) Methacrylic acid (5) | Cyclohexanone oxime. | 92 | 1.75 | 100 | 99 | 94 | 90 |
| 79 (reference) | Same as above | None | 90 | 1.71 | 98 | 96 | 84 | 77 |
| 80 | Vinylidene chloride (10) | Cyclohexanone oxime. | 91 | 2.01 | 95 | 93 | 86 | 84 |
| 81 (reference) | Same as above | None | 90 | 2.00 | 92 | 90 | 76 | 73 |
| 82 | Vinyl chloride (10) | Cyclohexanone oxime. | 92 | 1.96 | 96 | 94 | 87 | 85 |
| 83 (reference) | Same as above | None | 91 | 1.93 | 93 | 91 | 77 | 72 |
| 84 | Methyl vinylether (9) Sodium allylsulfonate (1) | Cyclohexanone oxime. | 92 | 1.76 | 100 | 99 | 92 | 83 |
| 85 (reference) | Same as above | None | 91 | 1.70 | 99 | 97 | 83 | 79 |
| 86 | Dimethyl malonate (10) | Cyclohexanone oxime. | 91 | 1.68 | 101 | 100 | 93 | 85 |
| 87 (reference) | Same as above | None | 90 | 1.50 | 100 | 98 | 89 | 80 |

What is claimed is:

1. A process for preparing a polymeric material by polymerizing (a) acrylonitrile or (b) acrylonitrile admixed with a minor amount of at least one ethylenically unsaturated compound copolymerizable therewith in an acidic aqueous medium at a temperature of from 10° C. to 80° C., using a catalyst system consisting of a redox type catalyst and at least one oxime of one of the two following general formulae:

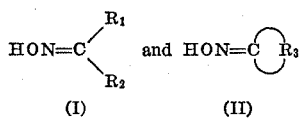

wherein $R_1$ and $R_2$ are each selected from the group consisting of hydrogen and an alkyl group having 1 to 10 carbon atoms, and $R_3$ represents an alkylene group having 4 to 10 carbons atoms, said redox system comprising (1) at least one oxidizing substance selected from the group consisting of persulfuric acid, the sodium, potassium, magnesium, ammonium salts thereof, hydroxylamine-N-monosulfonic acid, the sodium, potassium, magnesium, ammonium salts thereof, hydroxylamine-N,N-disulfonic acid, the sodium, potassium, magnesium, ammonium salts thereof, sodium chlorate, potassium chlorate and ammonium chlorate, and (2) at least one reducing sulfoxy compound selected from the group consisting of sulfurous acid, sodium potassium, magnesium, ammonium sulfite, sodium, potassium, magnesium, ammonium, hyposulfite, sodium, potassium, magnesium, ammonium bisulfite and sodium, potassium, magnesium, ammonium metabisulfite.

2. A process as claimed in claim 1, wherein the polymerization is effected in an aqueous medium of pH 1 to 4.

3. A process as claimed in claim 1, wherein the ethylenically unsaturated compound copolymerizable with acrylonitrile is selected from the group consisting of acrylic acid, methacrylic acid, methyl acrylate, ethyl acrylate, methyl methacrylate, acrylamide, methacrylamide, N,N-dimethyl acrylamide, methacrylonitrile, vinyl acetate, vinyl chloride, vinylidene chloride, methyl vinyl ether, dimethyl maloate, allyl sulfonic acid, methallyl sulfonic acid, p-styrene sulfonic acid, the sodium, potassium, ammonium salts of allyl sulfonic acid, methallyl sulfonic acid and p-styrene sulfonic acid.

4. A process as claimed in claim 3, wherein said ethylenically unsaturated compound is employed in an amount of 0.01 to 40 mole percent based on the acrylonitrile.

5. A process as claimed in claim 3, wherein said ethylenically unsaturated compound is employed in an amount of 0.01 to 15 mole percent of the acrylonitrile.

6. A process as claimed in claim 1, wherein the oxime is selected from the group consisting of formaldoxime, acetaldoxime, propionaldoxime, n-butylaldoxime, i-butylaldoxime, n-pentylaldoxime, i-pentylaldoxime, n-hexylaldoxime, i-hexylaldoxime, acetoxime, ethylmethylketoxime, ethyl-i-butyl-ketoxime, diethylketoxime, di - i - butylketoxime, di-n-propylketoxime, ethyl - i - pentylketoxime, ethyl-i-hexylketoxime, ethyl-n-octylketoxime, ethyl-n-nonylketoxime, ethyl-2-methylbutylketoxime, methyl-n-pentylketoxime, methyl-n-hexylketoxime, methyl - n - heptylketoxime, methyl - n - decanylketoxime, methyl - 2,2 - dimethylpropylketoxime, ethyl - 3,3 - dimethylpentylketoxime, n-butyl-i-pentylketoxime, cyclopentanone oxime, cyclohexanone oxime, cycloheptanone oxime, cyclooctanone oxime, cyclodecanone oxime and cycloundecanone oxime.

7. A process as claimed in claim 6, wherein said oxime is employed in an amount of about 5 to 100 percent by weight of the oxidizing substance.

8. A process as claimed in claim 1, wherein said oxidizing substance is employed in an amount of about 0.1 to 10 percent by weight of the acrylonitrile or the acrylonitrile admixed with a minor amount of at least one ethylenically unsaturated compound, and the reducing sulfoxy compound is employed in an amount of up to 30 percent by weight of the acrylonitrile or the acrylonitrile admixed with a minor amount of at least one ethylenically unsaturated compound.

9. A process as claimed in claim 1, wherein the polymerization is effected at a temperature of from 30° C. to 70° C.

10. A process as claimed in claim 1, wherein the acrylonitrile or the acrylonitrile admixed with a minor amount of at least one ethylenically unsaturated compound and water are present in a weight ratio of about 1:1 to 1:30.

References Cited

UNITED STATES PATENTS

| | | | |
|---|---|---|---|
| 3,202,641 | 8/1965 | Nakajima et al. | 260—79.3 |
| 3,607,835 | 9/1971 | Paleologo et al. | 260—63 N |

FOREIGN PATENTS

| | | | |
|---|---|---|---|
| 8,844 | 1962 | Japan | 260—85.5 N |

JOSEPH L. SCHOFER, Primary Examiner

J. KIGHT III, Assistant Examiner

U.S. Cl. X.R.

260—79.7, 85.5 R, ES, AM, XA, N, 85.7, 86.1 N, 88.7 R, F